(12) United States Patent
Retallick et al.

(10) Patent No.: US 7,306,781 B2
(45) Date of Patent: Dec. 11, 2007

(54) HYDROGEN GENERATOR

(75) Inventors: William B. Retallick, West Chester, PA (US); William A. Whittenberger, Leavittsburg, OH (US)

(73) Assignee: Catacel Corp., Garrettsville, OH (US)

( * ) Notice: Subject to any disclaimer, the term of this patent is extended or adjusted under 35 U.S.C. 154(b) by 435 days.

(21) Appl. No.: 10/888,488

(22) Filed: Jul. 9, 2004

(65) Prior Publication Data

US 2006/0008414 A1  Jan. 12, 2006

(51) Int. Cl.
*C01B 3/26* (2006.01)
(52) U.S. Cl. .......................... 423/652; 48/61; 422/171; 423/650; 423/651
(58) Field of Classification Search .............. 423/650, 423/651, 652, 653, 654, 648.1; 252/373
See application file for complete search history.

(56) References Cited

U.S. PATENT DOCUMENTS

| | | | | |
|---|---|---|---|---|
| 4,391,794 A | * | 7/1983 | Silberring | 423/650 |
| 4,985,230 A | * | 1/1991 | Baden et al. | 423/650 |
| 6,254,807 B1 | * | 7/2001 | Schmidt et al. | 252/373 |
| 6,641,795 B2 | * | 11/2003 | Abe | 423/648.1 |
| 6,946,113 B2 | * | 9/2005 | Seaba et al. | 423/648.1 |
| 2004/0265194 A1 | * | 12/2004 | Carroni et al. | 422/212 |
| 2006/0008414 A1 | * | 1/2006 | Retallick et al. | 423/652 |
| 2006/0013760 A1 | * | 1/2006 | Shi et al. | 423/648.1 |

* cited by examiner

*Primary Examiner*—Wayne A. Langel
(74) *Attorney, Agent, or Firm*—Pearne & Gordon LLP

(57) ABSTRACT

A hydrogen generator is formed of a strip of corrugated material that has been folded back and forth upon itself to define a monolith having multiple fluid flow regions. At least one of these regions is used for combustion, and at least one of these regions is used for steam reforming. Water is introduced into another fluid flow region, so as to receive heat from products of combustion, and to be converted into steam. The steam is directed into one or more regions used for steam reforming, so as to produce hydrogen for use in a fuel cell. In its more general form, the invention includes a compact heat exchanger, formed of a strip of corrugated material that has been folded back and forth upon itself, the heat exchanger being capable of transferring heat among three or more fluid streams.

5 Claims, 4 Drawing Sheets

HYDROGEN GENERATOR

BACKGROUND OF THE INVENTION

The present invention relates to the production of hydrogen by steam reforming, and provides a compact heat exchanger capable of supporting all of the functions required in a catalytic steam reforming process.

The hydrogen produced by the present invention is intended to be used to operate a fuel cell. A fuel cell consumes hydrogen while producing electric power.

Steam reforming refers to the endothermic reaction whereby hydrogen is produced from methane, or from some other hydrocarbon. The steam reforming reaction, when the fuel is methane, is as follows:

$$CH_4 + H_2O \rightarrow CO + 3H_2$$

For reforming a C8 hydrocarbon, the reaction is:

$$C_8H_{18} + 8H_2O \rightarrow 8CO + 17H_2$$

If the fuel cell is to be used to power a vehicle, the fuel cell, and the steam reformer used to supply hydrogen to the fuel cell, must be compact. Also, steps must be taken to reduce or eliminate the carbon monoxide products, which will quickly poison the membrane in the fuel cell.

Because the steam reforming reaction is endothermic, the steam reforming reaction must have a source of heat. Therefore, building a steam reformer involves construction of a heat exchanger suitable for supplying heat for the reaction.

It has been proposed to provide a heat exchanger formed of a strip of metal that has been folded back and forth upon itself. Examples of such heat exchangers are provided in copending patent application Ser. No. 10/417,410 and copending patent application Ser. No. 10/812,506, the disclosures of which are hereby incorporated by reference.

In the above-cited applications, the heat exchanger is configured such that heat can be exchanged between only two fluid streams. The present invention has, as its major component, a heat exchanger, also formed of a folded strip, but this heat exchanger enables heat transfer among three or more fluid streams. By combining various heat exchange operations in a single heat exchanger, the hydrogen generator of the present invention achieves the objective of producing hydrogen within a relatively compact space.

SUMMARY OF THE INVENTION

The present invention includes, in one embodiment, a heat exchanger made from a strip of metal which has been folded back and forth upon itself to form a monolith. The strip is corrugated, except in flat bands near the longitudinal edges of the strip. Pairs of folds of the strip define fluid flow regions. Each such flow region is in heat exchange relationship with its immediately adjacent flow regions, but not in direct fluid connection therewith. A set of conduits directs fluids from external sources into desired fluid flow regions, and from one region to another, to achieve the desired functions. The heat exchanger can be expanded simply by providing a longer strip with more folds. The heat exchanger allows heat transfer among three or more different fluid streams.

In a preferred embodiment, the heat exchanger described above is configured as a hydrogen generator. At least one of the fluid flow regions comprises a combustion chamber, into which fuel and air are directed. The walls of the combustion chamber, which are defined by surfaces of the strip, are coated with a combustion catalyst. At least one of the fluid flow regions comprises a steam reforming chamber, into which fuel and steam are directed. The steam reforming chamber has walls that are coated with a steam reforming catalyst. Air and water are directed into the system from the outside, the air and water being first conveyed through other fluid flow regions which are in heat exchange relationship with product gases from the combustion and/or steam reforming reactions. Thus, the water is heated to make steam for use in the reforming reaction. Also, by transferring heat from the product gases to the incoming air water, one minimizes the waste of energy.

The hydrogen generator of the present invention is therefore relatively compact, as it combines all of the elements necessary to produce hydrogen by steam reforming into one structure formed from a folded strip.

The present invention therefore has the primary object of providing a hydrogen generator.

The invention has the further object of providing a heat exchanger, formed from a folded metal strip, wherein the heat exchanger facilitates the transfer of heat among three or more distinct fluid streams.

The invention has the further object of making it more practical to operate a fuel cell, by providing apparatus for making hydrogen.

The invention has the further object of providing a hydrogen generator which is compact.

The invention has the further object of providing a hydrogen generator from a folded metal strip, wherein multiple combustion chambers and steam reforming chambers can be formed by increasing the length of the strip and providing additional folds.

The invention has the further object of providing a hydrogen generator as described above, wherein the reactions necessary to make hydrogen are started by passing an electric current through the folded metal strip.

The reader skilled in the art will recognize other objects and advantages of the invention, from a reading of the following brief description of the drawings, the detailed description of the invention, and the appended claims.

DETAILED DESCRIPTION OF THE INVENTION

The present invention includes a heat exchanger, formed of a folded strip, the heat exchanger permitting the transfer of heat among three or more fluids. A primary use of this heat exchanger is as a hydrogen generator. The hydrogen generator combines combustion and steam reforming stages in the same unit, as well as stages which provide heat exchange between incoming fluids and product gases.

Figure 1:
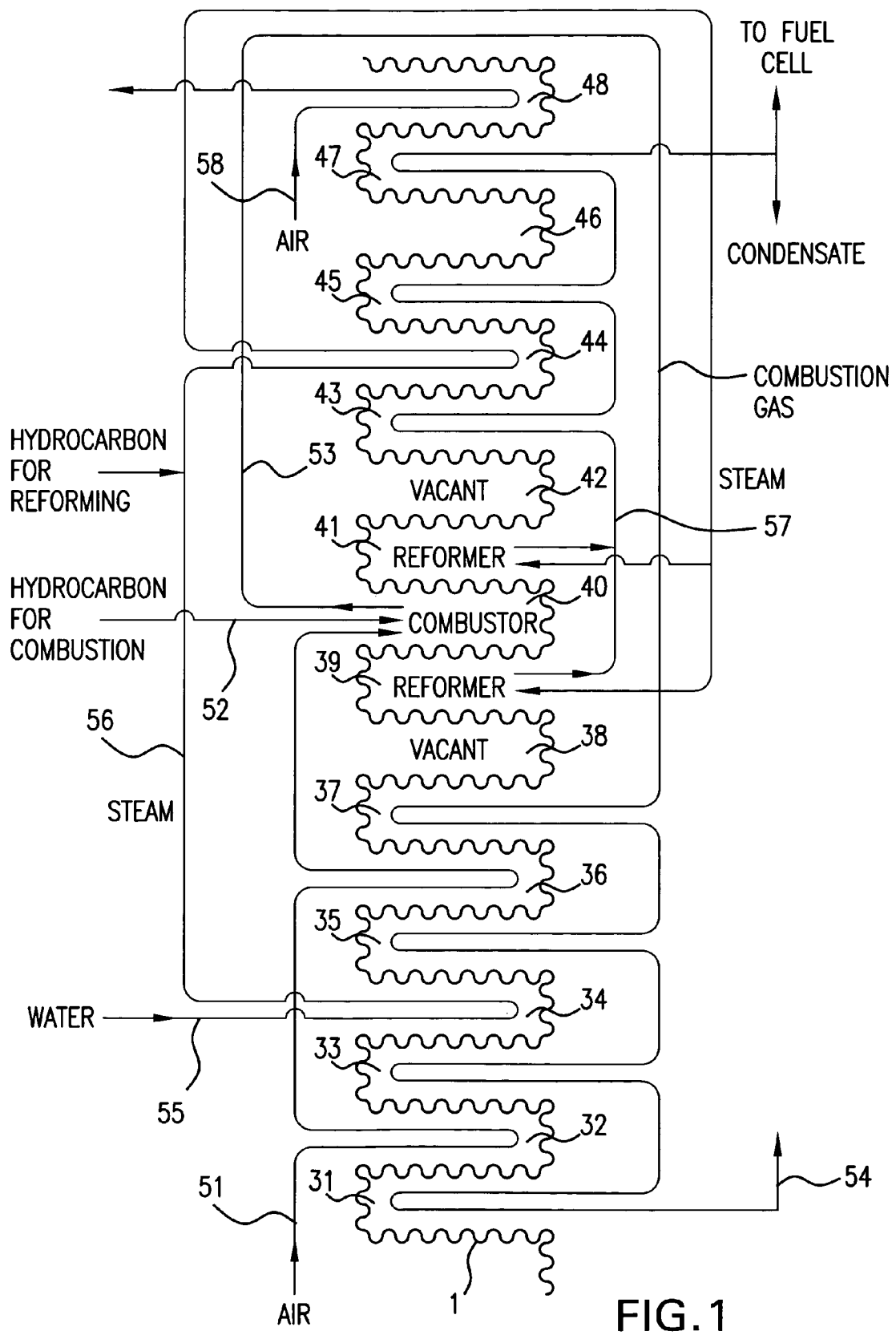
FIG. 1 provides a partially schematic diagram of the hydrogen generator of the present invention.

FIG. 1 provides a diagram showing the hydrogen generator of the present invention. The diagram is partly schematic, insofar as the fluid conduits are represented by solid lines. But the diagram is also partly representational, insofar as the wavy line is a depiction, in a very simplified form, of the corrugated folded strip 1 used to define the hydrogen generator.

The basic concept of the heat exchanger used in the present invention is to provide a corrugated strip, folded back and forth upon itself to define fluid flow regions, and to direct various fluids into the various regions as necessary. When the heat exchanger is configured to make hydrogen, the fluids are directed so as to conduct and support the chemical reactions implied in a steam reforming process. The details of operation will be described later. The following paragraphs describe the physical structure that provides the desired fluid flow.

Figure 2:
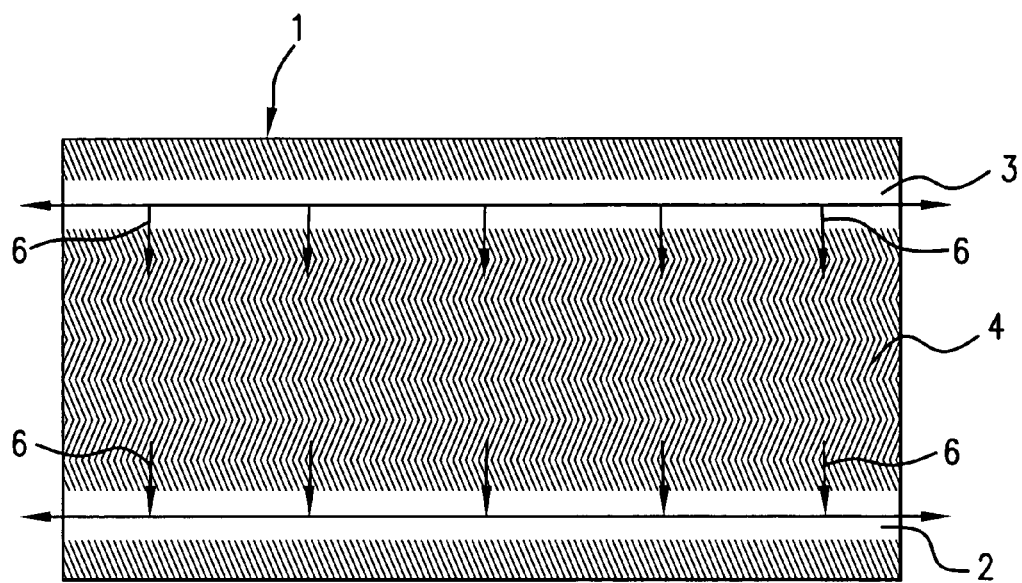
FIG. 2 provides a plan view of a piece of modified, partly-corrugated metal foil which may be used to make the heat exchanger employed in the present invention.
Figure 3:
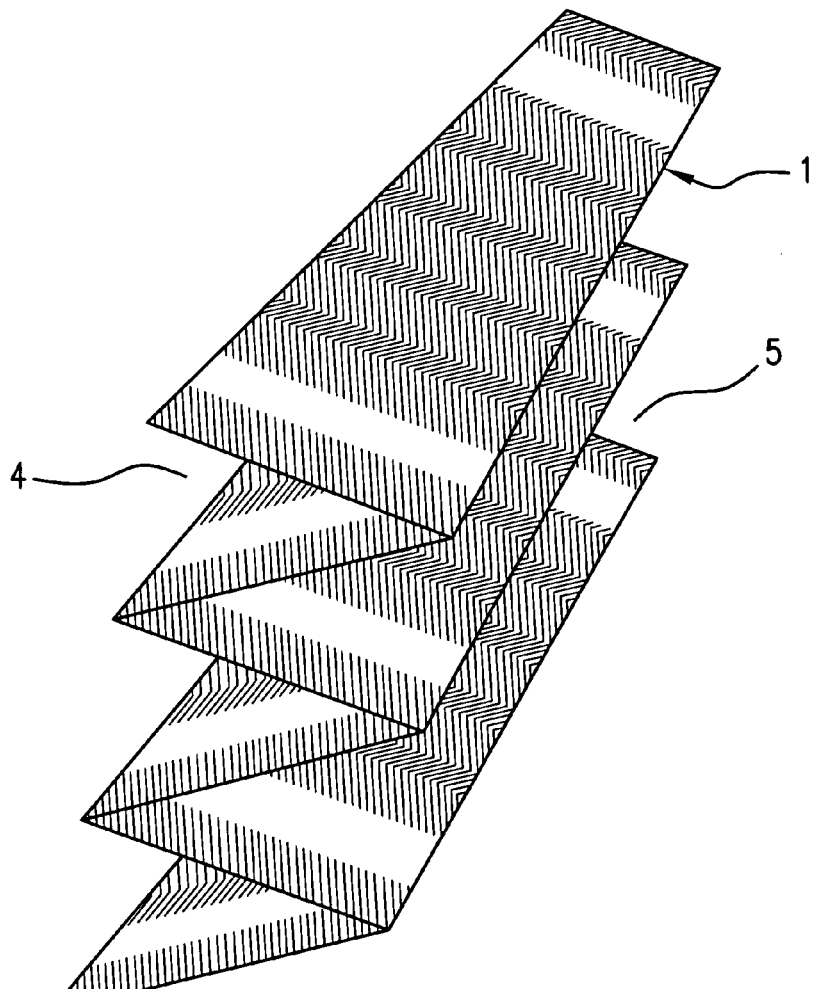
FIG. 3 provides a perspective view showing the folding of the metal foil of FIG. 2 into a zig-zag pattern, to make the heat exchanger used in the present invention.

FIGS. 2 and 3 provide structural details of the strip 1 of FIG. 1. As shown in FIG. 2, strip 1 is corrugated with herringbone corrugations, except along two bands 2 and 3 disposed near the longitudinal edges of the strip. When the strip has been folded, the uncorrugated areas defined by the bands form channels for fluid flow. More particularly, these uncorrugated areas will become manifolds which distribute the fluid among a plurality of parallel paths, as indicated by the arrows 6, and which collect the fluid after it has passed through such parallel paths.

The strip 1 is folded back and forth upon itself, in a zig-zag pattern, to form the monolith shown in FIG. 3. The monolith defines a plurality of fluid flow regions, each such region being formed by a pair of adjacent folded segments of the strip. As illustrated in FIG. 3, every other such region, such as region 4, is open to the left-hand side, and the remaining regions, such as region 5, are open to the right-hand side. This same arrangement of fluid flow regions is preserved in the diagram of FIG. 1. However, when the heat exchanger is finished, various openings in the structure are sealed off, to insure that fluid flows only where desired. FIG. 1 shows that each fluid flow region is in heat exchange relationship with an adjacent fluid flow region, but not in direct fluid connection therewith.

Figure 5:
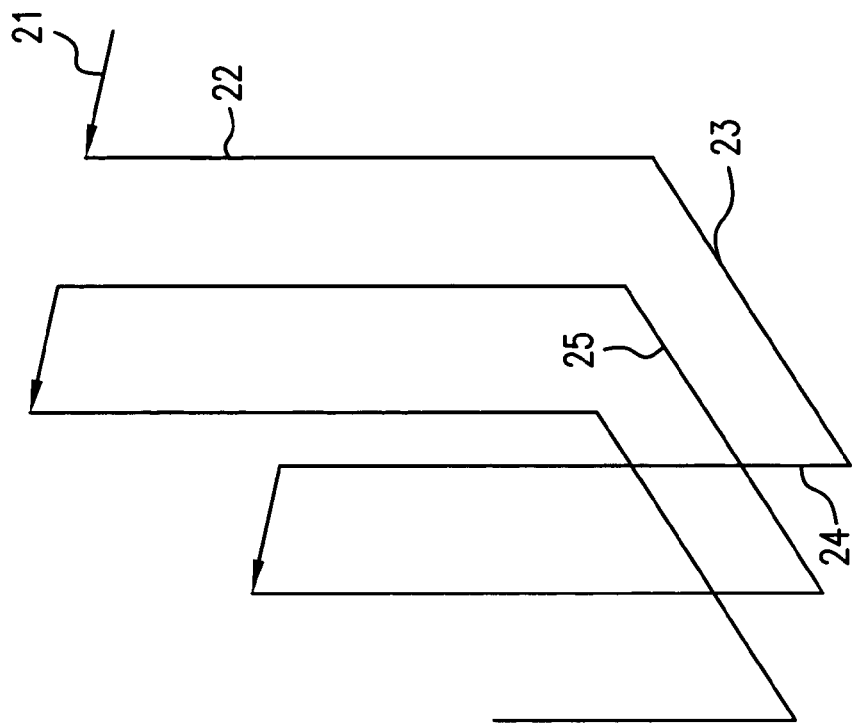
FIG. 5 provides a schematic diagram illustrating the path of fluid flow from one chamber of a heat exchanger to the next, as used in the present invention.
Figure 4:
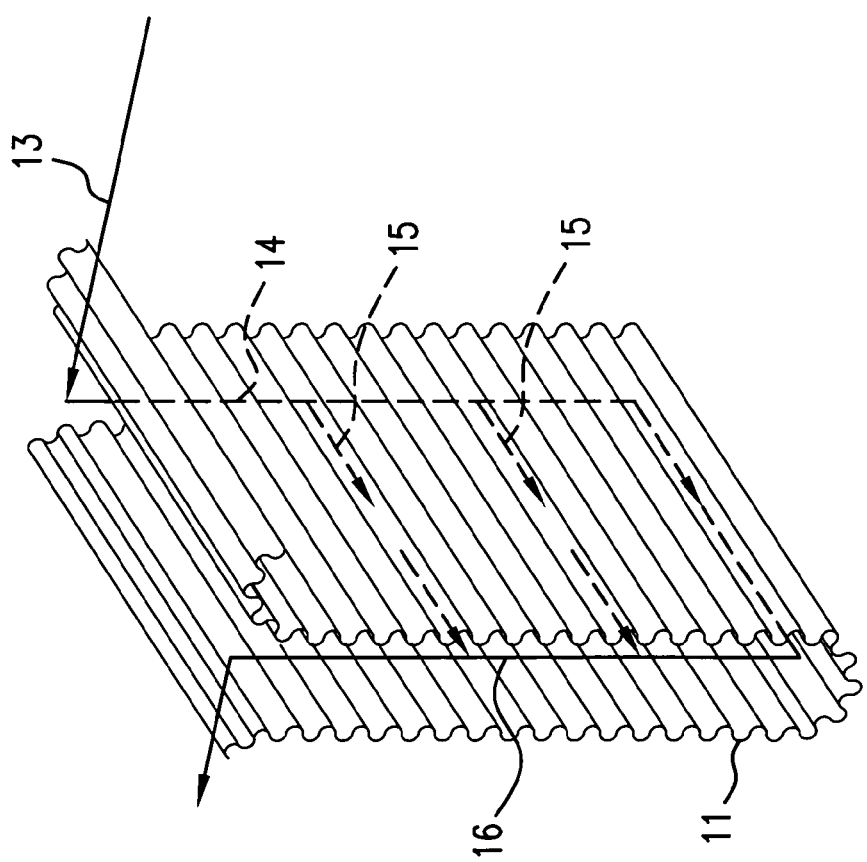
FIG. 4 provides a perspective view of one of the combustion chambers defined by the heat exchanger used in the present invention, and showing the direction of flow of fluid through such chamber.

FIGS. 4 and 5 provide more details concerning the fluid flow within each region, and from one region to the next. FIG. 4 shows a typical fold of corrugated strip 11. For simplicity of illustration, the flat, uncorrugated bands, illustrated in FIGS. 2 and 3, are not shown in FIG. 4. Fluid enters along the path defined by arrow 13, then flows along the path defined by arrow 14, the latter path corresponding to the flat, uncorrugated area described above. For simplicity of illustration, the uncorrugated areas are not shown in FIG. 4.

The fluid flowing along the latter path is then distributed among the many parallel channels defined by the corrugations, as indicated by arrows 15. Arrows 15 identify only some of the many parallel paths through which the fluid can flow. It is while the fluid is flowing along these parallel paths that the major work of the invention is done. More specifically, while flowing along these parallel paths, the fluid is either undergoing a chemical reaction (e.g. combustion or steam reforming) or undergoing heat exchange with fluid in an adjacent region, or both.

When the fluid has passed through the parallel channels indicated by arrows 15, i.e. when it has traversed the width of the strip, the fluid flows out of the region along the path indicated by arrow 16, which path is defined by the other flat, uncorrugated portion of the strip.

FIG. 5 illustrates the flow path of fluid from one region to the next, without showing the actual corrugated strip. Fluid enters as shown by segment 21, then flows along the flat area as indicated by segment 22. The fluid then flows across the channels, in parallel paths, represented by segment 23, and then flows out of the region along the path indicated by segment 24. The fluid then flows into the next region in a similar manner, except that, as shown in FIG. 5, the fluid flow within the channel will be from left to right (as represented by segment 25) instead of from right to left (as represented by segment 23).

Note that FIGS. 2 and 4 do not show the end caps, or other means, for sealing the ends of the strip, so that the fluid flows along the flat areas as desired, and does not escape to the outside. Also, appropriate conduits are necessary to direct the fluid flow from one region to the next. These conduits are illustrated schematically in FIGS. 4 and 5.

The operation of the hydrogen generator of the present can now be described, with reference to FIG. 1.

As described above, the hydrogen generator comprises a strip 1, preferably made of metal foil, which is folded back and forth upon itself as shown. The strip is corrugated, as indicated by the wavy line representing the strip, but has uncorrugated bands as shown in FIGS. 2 and 3. These uncorrugated bands are not shown in the diagram of FIG. 1. The folds of the strip define a plurality of fluid flow regions, each such region being as depicted in FIG. 4. Fluid flow regions 31, 33, 35, 37, 39, 41, 43, 45, and 47 are oriented to receive fluid flow from the right-hand side of the figure, and fluid flow regions 32, 34, 36, 38, 40, 42, 44, 46, and 48 are oriented to receive fluid flow from the left-hand side. Thus, the regions represented by even numbers can be in heat exchange with regions represented by odd numbers, but there is no direct fluid flow between an even-numbered region and an odd-numbered region. Note also that the orientation of any fluid flow region does not prevent it from receiving fluid from the opposite side of the monolith, as long as the necessary piping is provided. Thus, for example, a fluid source on the left-hand side could be directed to a fluid flow region oriented to receive fluid from the right-hand side.

The strip, in practice, is enclosed in a suitable canister (not shown), and fluid flow conduits are constructed to provide the indicated flow paths. Each conduit is represented by a single line in FIG. 1.

The partially schematic diagram of FIG. 1 makes it appear that the even-numbered regions are open to the left-hand side and that the odd-numbered regions are open to the right-hand side. But in practice, these apparent openings are sealed off, so that fluid flows only in the desired manner described below.

Air enters the system through conduit 51, and is directed through fluid flow regions 32 and 36, and then into region 40 which comprises a combustion chamber. A hydrocarbon fuel for combustion flows through conduit 52, into region 40. The walls of the combustion chamber are coated with a combustion catalyst (not represented in the figure). These walls are defined by a pair of opposing folds of the corrugated strip, such as is illustrated in FIG. 4. Combustion gas leaves the combustion chamber through conduit 53, and is directed by the conduit to the other side of the structure, where the gas passes through fluid flow regions 37, 35, 33, and 31. The combustion gas therefore heats the incoming air, by heat exchange with regions 32 and 36. The combustion gas is eventually vented to the outside, as indicated by reference numeral 54.

Water is introduced into the system through conduit 55, which directs the water into fluid flow region 34. The water is therefore in heat exchange relationship with the combustion gas flowing through regions 35 and 33, and is heated to form steam. Ideally, the majority of the heat of the combustion gas is transferred either to the water or to the air, so that the residual combustion gas is vented at a relatively low temperature, thereby minimizing the waste of energy.

The steam leaves region 34, and is directed through conduit 56, which can be viewed as a continuation of conduit 55. A hydrocarbon to be reformed is added to conduit 56, and thereby mixed with the steam. This mixture passes first through fluid flow region 44, where it is heated further by heat exchange with the products of the steam reformer (described below), and then introduced, in parallel, into regions 39 and 41. Regions 39 and 41 are steam reforming chambers, and have catalysts for steam reforming coated on their walls. The steam reforming reaction proceeds in both of these regions 39 and 41, and the products of the reaction flow through conduit 57, through regions 43, 45, and 47, and then out to the fuel cell as shown. Condensate from the output stream may be captured as shown.

The steam reforming products therefore provide additional heat to the incoming steam and fuel mixture, by heat exchange with region 44.

The products of the steam reforming reaction preferably pass through a final stage of water-gas shift which is cooled with air. The water-gas shift occurs in region 47, and the cooling air is supplied through conduit 58. Heat transferred to this air could be recovered, but such recovery means are not shown in FIG. 1, for simplicity of illustration.

Fluid flow regions 38 and 42 do not receive any fluids, and are labeled as vacant stages. The purpose of the vacant stages is to insulate the two reforming chambers.

In summary, FIG. 1 shows a strip of metal, formed into a reactor for steam reforming a hydrocarbon to produce hydrogen for a fuel cell. The incoming air for combustion is preheated in two stages of heat exchange with the combustion gas. The steam is generated by one stage of exchange with the combustion gas (region 34), and by one stage of exchange with the reformer product (region 44). The combustor is nested between two parallel stages of steam reforming, such that the reforming stages absorb the heat from combustion. Vacant stages outboard of the two reforming stages provide insulation for those stages. The reformer product may pass through a final stage of water-gas shift which is cooled with air.

Figure 6:
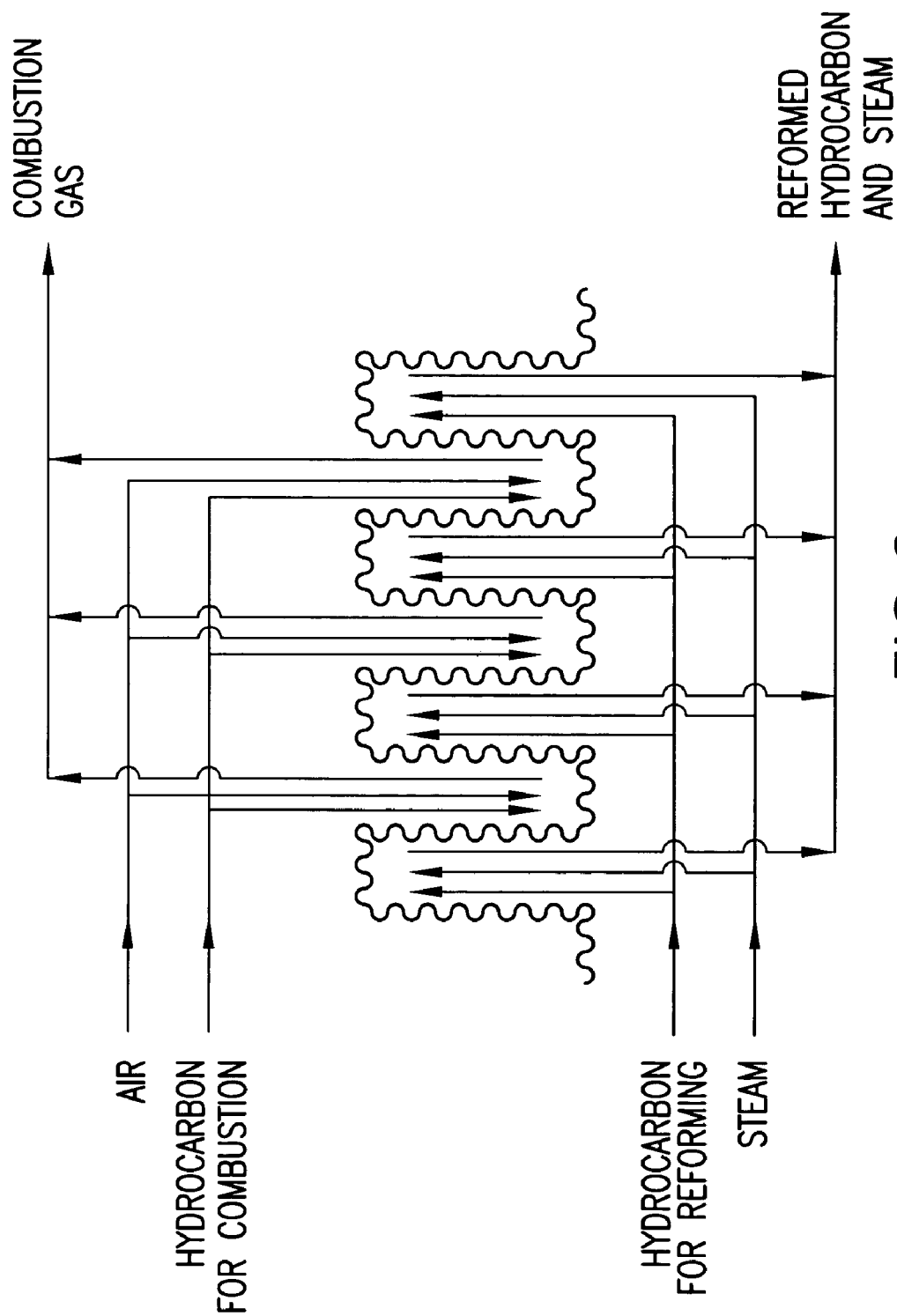
FIG. 6 provides a schematic diagram of an embodiment of the present invention wherein there are a plurality of combustion chambers in heat exchange relationship with a plurality of steam reforming chambers.

The arrangement of FIG. 1 includes one combustion region 40 and two surrounding reforming regions 39 and 41. In practice, there may be a plurality of combustion regions and reforming regions. Instead of having a single combustion region nested between two reforming regions, the combustor and the reformer could comprise an extended set of folds, wherein combustion regions alternate with reforming regions. Such an arrangement is shown in FIG. 6. Air and hydrocarbon fuel are directed into three combustion regions, while steam and a hydrocarbon are directed into four reforming regions which are in heat exchange relationship with the combustion regions.

Also, additional fluid flow regions could be provided with respect to the other heat exchange functions, such as for the conversion of water to steam. Thus, many variations of the arrangement of FIG. 1 are possible. In general, the outermost regions are preferred for reforming, because the latter arrangement is preferable for capturing the heat from combustion.

The following paragraphs present heat balances for the reactions in the reformer. The fuel used in this example is $C_8H_{18}$, which is liquid at 25° C. In the following discussion, the basic unit of fuel is one gram mol of liquid normal octane at 25° C.

The combustion reaction that drives the reforming reaction is $$C_8H_{18}+(25/2)O_2 \rightarrow 8CO_2+9H_2O$$

The oxygen is supplied as air at 110% of stoichiometric. The combustion gas is cooled to 100° C. by heat exchange with the incoming air and water. Then the heat available to drive the reforming reaction is 1174 Kcal.

The reforming reaction is $$C_8H_{18}+24H_2O \rightarrow 4.2CO_2+3.8CO+21.2H_2+11.8H_2O$$

where the heat absorbed is 726 Kcal, when the reaction products are gases at 650° C., and the two feeds are liquids at 25° C.

The composition of the reformate is the water-gas shift equilibrium composition at 650° C. The temperature 650° C. is chosen because reforming action is fast enough at 650° C. The reformate is cooled to 400° C. by generating steam by heat exchange, as described above. This cooling saves 85 Kcal. Then, the mols of $C_8H_{18}$ that must be combusted to drive the reforming reaction is $$(726-85)/1174=0.546$$

Next, we present heat balances wherein the same 1.00 mol of $C_8H_{18}$ is reformed with these two reactions:

$$(1/4)C_8H_{18}+O_2+3.8N_2 \rightarrow 2CO+(9/4)H_2+3.8N_2$$

$$(3/4)C_8H_{18}+18H_2O \rightarrow 6CO_2+(75/4)H_2+6H_2O$$

Adding these reactions gives:

$$C_8H_{18}+1.0O_2+18H_2O+3.8N_2 \rightarrow 6CO_2+2CO+6H_2O+21H_2+3.8N_2$$

The equilibrium composition at 650° C. is 3.8 mols $N_2$, 3.7$CO_2$, 4.3CO, 18.7$H_2$, and 8.3$H_2O$.

The heat input for this combined reaction with the products at equilibrium composition, at 650° C., is 532 Kcal. As before, the reformer product is cooled to 400° C. in the steam generator portion of FIG. 1. This saves 73 Kcal. Then, the mols of $C_8H_{18}$ needed to drive the reaction is:

$$(532-73)/1174=0.391$$

The table below gives a comparison of the two reactions. The mols of $H_2$+CO produced per mol of $C_8$ reformed plus mols combusted is nearly the same for both reactions. A disadvantage of the partial oxidation process is that the product is diluted with nitrogen. An advantage is that it uses less water.

|  | Steam Reforming only | Mixed Reactions |
|---|---|---|
| Mols $C_8H_{18}$ reacted | 1.00 | 1.00 |
| By Steam Reforming | 1.00 | 0.75 |
| By Partial Oxidation | 0 | 0.25 |
| Mols steam reacted | 24 | 18 |
| Mols $O_2$ reacted | 0 | 1.0 |
| Temp. of oxidation ° C. | 750 | 750 |
| Temp. of reforming ° C. | 650 | 650 |

-continued

|  | Steam Reforming only | Mixed Reactions |
| --- | --- | --- |
| Combustion gas out at ° C. | 100 | 100 |
| Reformer production out at ° C. | 400 | 400 |
| Mols $C_8H_{18}$ combusted | 0.55 | 0.39 |
| Mols $H_2$ produced | 21.2 | 18.7 |
| Mols CO produced | 3.8 | 4.3 |
| Mols $N_2$ in product | 0 | 3.8 |

The hydrogen generator of the present invention can be made from a single strip of metal that can be heated electrically to start the reactions. Alternatively, the single strip could be divided into several distinct segments, and the electric current can be applied only to the segment that comprises the folds for combustion and reforming.

The alternative wherein the electric current is applied only to certain segments would be used for the following reasons. It is desirable that the hydrogen generator begin working in a very short time after being turned on. Preferably, this warm-up time should be no more than about 15 seconds. If ambient temperature is assumed to be about 20° C., and if the combustion temperature is about 350° C., it is necessary to raise the temperature of the strip by about 22° per second. If the strip weighs one kg, this would require a power of 11,000 watts. This amount of power will not likely be available. Consequently, electrical power may be applied only to a portion of the reactor, i.e. only to a segment or segments of the strip on which the combustion and steam reforming reactions are to occur. Thus, this portion of the reactor can reach operating temperature very quickly, at reasonable power levels. The heat of combustion conducted and radiated from that portion will heat the remainder of the reactor, allowing the overall unit to reach its operating temperature in a reasonable amount of time.

The folds in the strip touch one another. To prevent short circuiting when the strips are heated electrically, the strip may be coated on both sides with an electrical barrier. Where there is a catalyst coating on the strip, the barrier goes under the catalyst coating.

An electrical barrier may be made in the following way. The strip is coated with alumina. The alumina is impregnated with a solution that contains nickel. It is convenient to make the solution by dissolving nickel formate in concentrated ammonium hydroxide. The strip is dried and calcined at about 800° C. The resulting barrier is hard and adheres tightly.

The invention has been characterized as a hydrogen generator, because the object of the apparatus represented in FIG. 1 is to produce hydrogen. But the invention can be described in more general terms. The invention is ultimately a heat exchanger which enables heat transfer among three or more fluid streams. More particularly, the heat exchanger of the present invention is formed of a corrugated strip, or its equivalent, folded back and forth upon itself, together with the necessary piping and baffling to achieve the desired fluid flows. Thus, the invention comprises a compact, folded-strip heat exchanger, that can accommodate three or more fluid streams. The invention is therefore not limited to use in steam reforming or hydrogen production.

From the above description, it is apparent that the hydrogen generator of the present invention can be made of a single folded strip. A single-strip construction is likely to be the most compact, and for some applications, compactness is of paramount importance. However, the invention is not limited to the use of a single strip. In practice, it is possible to provide one or more separate strips, all of which, when taken together, comprise the equivalent of the single-strip embodiment shown in the figures. That is, the finished structure could be equivalent to what is shown in FIG. 1, except that there would be one or more breaks in the continuity of the strip. To the extent that the hydrogen generator is to be heated electrically, it would be practical to provide a separate strip for stages that need not be heated electrically, such as heat exchanges between combustion gas and incoming air. The invention could be made of more than one strip even in cases where electrical heating is not used.

If multiple strips are used, it is contemplated that the number of such strips would normally be small, perhaps not more than ten, as each strip would itself still be folded back and forth multiple times.

The invention can be modified in various ways. For example, the number of combustion regions and reforming regions, as well as the numbers of regions used for simple heat exchange, can be varied almost infinitely. Moreover, the internal structure of the monolith can be different. For example, instead of using the flat bands described above, one can combine a folded corrugated strip with a plurality of corrugated pieces having corrugations that are oblique to the corrugations of the strip, as is described in copending U.S. patent application Ser. No. 10/812,506, the disclosure of which is incorporated by reference herein. The latter reference provides fluid flow regions having flow paths similar to what has been described above.

In the embodiments described above, the corrugated strip has uncorrugated bands near its longitudinal edges. It is possible to construct the strip without such uncorrugated bands, and to provide other conduit means for directing the gas flow as desired.

The above and other modifications, which will be apparent to the reader skilled in the art, should be deemed within the spirit and scope of the following claims.

What is claimed is:

1. A method of making hydrogen, comprising:
   a) directing a hydrocarbon fuel into a combustion region of a monolith formed by folding a corrugated strip back and forth upon itself to define a plurality of fluid flow regions, said plurality of fluid flow regions comprising a first fluid flow regions, second fluid flow region and a third fluid flow region, said first, second and third fluid flow regions being different fluid flow regions, said first fluid flow region defining the combustion region, the combustion region having a combustion catalyst,
   b) directing a hydrocarbon fuel into said second fluid flow region which defines a steam reforming region, the steam reforming region having a steam reforming catalyst,
   c) directing a stream of water into said third fluid flow region, while directing products of the combustion region so as to be in heat exchange relationship with said stream of water, so as to produce steam, and
   d) withdrawing hydrogen from said steam reforming region.

2. The method of claim 1, further comprising the step of passing an electrical current through the strip so as to heat the strip.

3. The method of claim 1, further comprising directing air into said combustion region.

4. The method of claim 3, further comprising directing the air through a fluid flow region which is in heat exchange relationship with products of said combustion region.

5. The method of claim 1, further comprising directing steam and hydrocarbon fuel into a fluid flow region that is in heat exchange relationship with products of said steam reforming region.

* * * * *